Sept. 11, 1962    H. VONARBURG    3,054,062
PHASE DISCRIMINATOR
Filed Sept. 2, 1959    3 Sheets-Sheet 1

INVENTOR.
Hansjörg Vonarburg
BY
Pierce, Schiffler & Parker
Attorneys

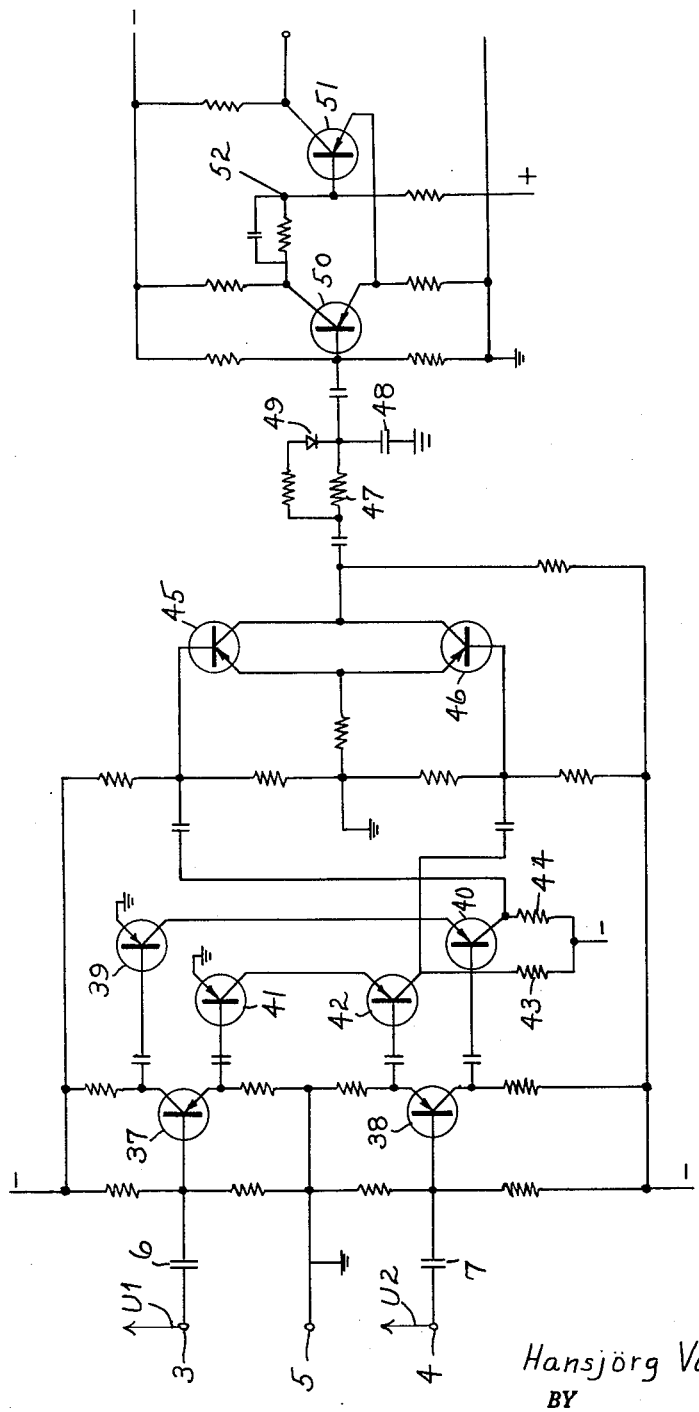

3,054,062
Patented Sept. 11, 1962

3,054,062
PHASE DISCRIMINATOR
Hansjörg Vonarburg, Wettingen, Switzerland, assignor to Aktiengesellschaft Brown, Boveri & Cie, Baden, Switzerland, a joint-stock company
Filed Sept. 2, 1959, Ser. No. 837,622
Claims priority, application Switzerland Sept. 4, 1958
7 Claims. (Cl. 328—133)

The invention relates to a phase discriminator, particularly for long distance-relays which compares the phase of two A.-C. measuring quantities and transforms it into D.-C. impulses, the comparison being effected by means of special diode and amplifier circuits which can consist of vacuum tubes and transistors.

Arrangements are already known which compare the phases of two A.-C. measuring quantities and derive therefrom impulses with which a command, for example, the disconnection of a switch, is effected. In these arrangements the sinusoidal A.-C. measuring quantities are fed to the discriminator as voltages. The sinusoidal form is transformed, for example, by means of saturated amplifier circuits, into a rectangular form. In the known embodiments a half wave, mostly the positive is used for the comparison. In this transformation the zero passages must not be displaced mutually, otherwise the phase will not be measured correctly. The two transformed measuring voltages are now fed to a diode circuit in which an output voltage appears only when both measuring quantities are positive. This circuit is known in computer engineering as multiplication circuit. The width of the rectangular voltage formed at the output is then as great as the two supplied rectangular voltages overlap. If both measuring quantities are in phase, this overlapping is a half cycle and corresponds thus to an overlap duration of 180 deg. The greater the phase displacement, the smaller is the overlapping time, until there is no output voltage any more with a phase displacement between the two compared voltages of 180 deg. The overlapping time is thus a measure for the phase displacement, provided that the respective frequencies of the two voltages remain constant. If one desires to transmit an impulse starting from certain phase displacement, which disconnects, for example, the respective switch, the rectangular voltage formed is fed to an integrator which can consist, for example of a resistance-condenser combination, and which has a certain time constant for the charge of the condenser. Depending on the duration of the appearance of the rectangular voltage, the condenser is charged more or less. At the condenser is then formed a voltage amplitude which is the higher the longer the rectangular voltage representing the extent of the overlap is effective. It is advisable to feed the approximately triangular or sawtooth voltage thus formed to an amplitude comparator in which an impulse is released, starting from a certain value of the supplied voltage. In this manner the release of this impulse becomes dependent on the phase of the associated measuring quantities.

This arrangement has the disadvantage that an impulse is only produced once in each cycle. In the most unfavorable case, the phase of a measuring quantity can therefore only be determined after a full cycle. This time is too long for relays, particularly of transmission lines, since release times of less than a half cycle have been achieved already by means of magnetic relays.

It is therefore necessary to reduce the impulse sequence to a lower time. This is the problem underlying the subject of the invention.

The object of the present invention is to obtain an impulse voltage having an amplitude representative of the displacement in phase between the two input alternating current voltages being compared for each half cycle or half wave of these two voltages.

In accordance with one embodiment of the invention, the wave forms of the two input alternating current voltages, which are usually essentially sinusoidal, are converted into an essentially rectangular configuration. From each of these rectangularly configured input wave forms two equal rectangularly configured control voltages are derived, one such voltage being in phase and the other being 180° out of phase with its corresponding input. The positive half waves of the two in-phase control voltages are then combined to determine the extent of the overlap therebetween, and this is followed one half cycle later by a combination of the positive half waves of the two 180° out-of-phase control voltages to determine the extent of the overlap therebetween. Thus, for each half cycle there is obtained a combined voltage which is representative of the overlap. The combined voltages, each of which has a duration proportional to the extent of the overlap are then supplied in succession, such as through a mixer circuit, to an integrator in the form of a resistor-condenser combination wherein the voltage to which the condenser is charged is proportional to the duration of each of the combined voltages. The voltage to which the condenser is charged thus represents the displacement in phase between the two input alternating current voltages being compared and appears once for each half cycle of the latter two voltages rather than once for each full cycle as has been obtained with the prior known arrangements.

The condenser voltage can then be compared with a reference voltage and switching means associated with long-distance relaying apparatus can then be arranged to be actuated when the difference between the condenser and reference voltages reaches a preselected amplitude, or attains a zero value.

The foregoing as well as other objects and advantages will become more apparent from the following description of selected embodiments thereof together with the appertaining drawings which accompany the same. In these drawings:

FIG. 3 is also a schematic electrical diagram illustrating a modification of the FIG. 1 circuit when transistors are used in lieu of electronic tubes.

Figure 1:
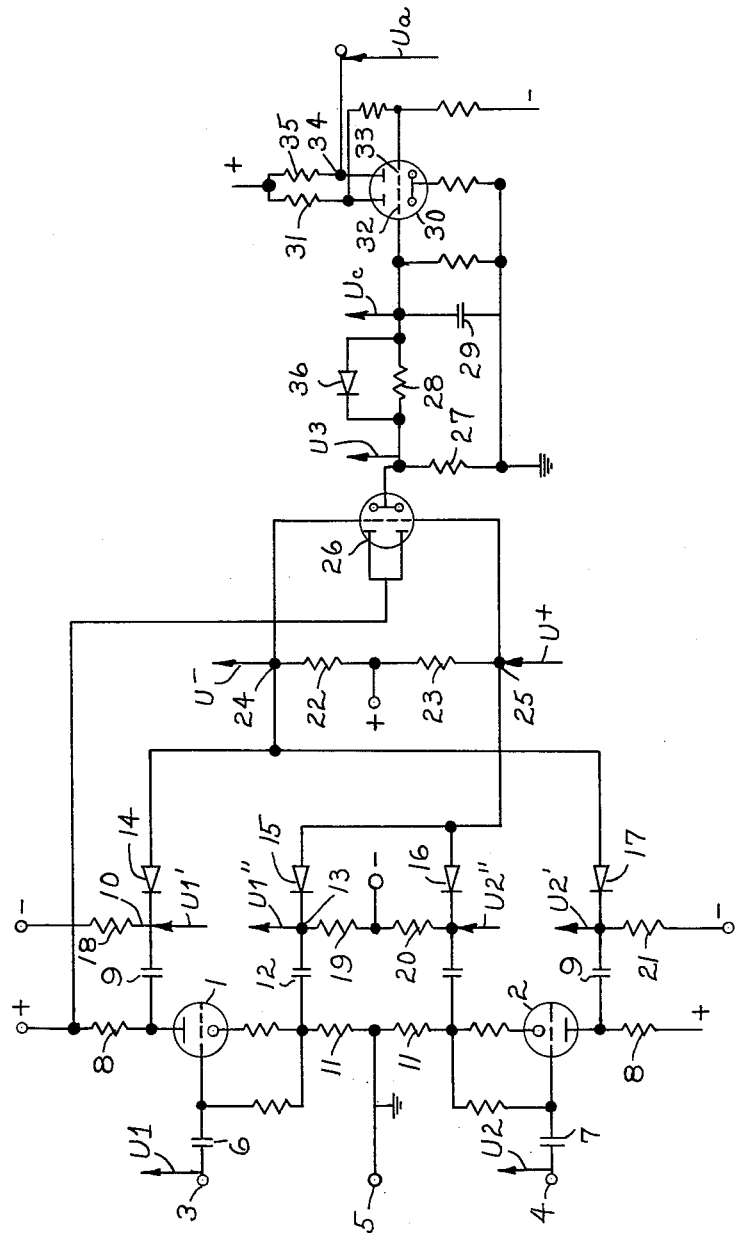
FIG. 1 is a schematic electrical diagram of one embodiment of the invention employing electronic tubes.
Figure 2:
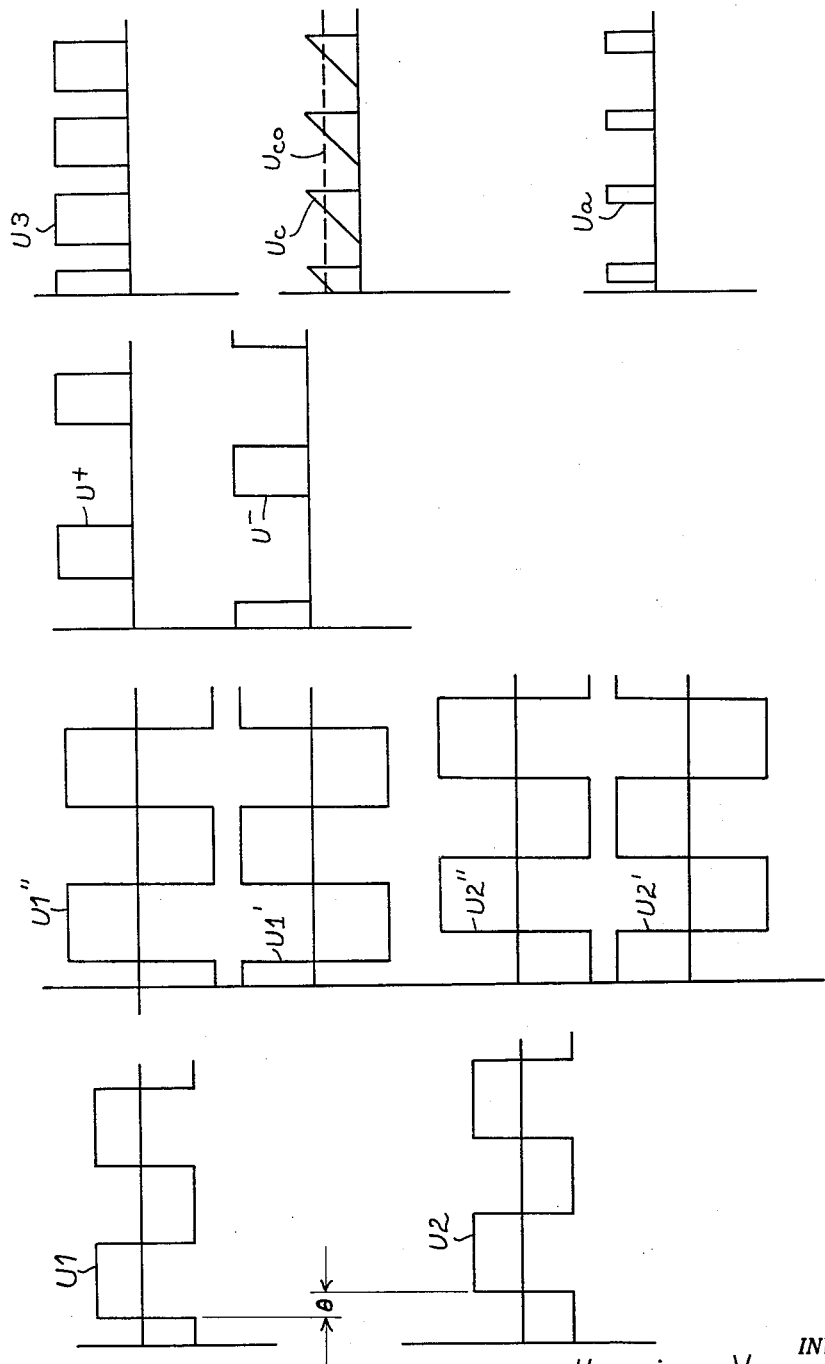
FIG. 2 is a graph showing the associated curves of the measuring quantities.

Referring now to FIGS. 1 and 2, it is to be first noted that the means for transforming the sinusoidal wave voltages into rectangular form have been omitted for the sake of clarity and simplification since such means, per se, are well known. The measuring quantities transformed into rectangular form are designated with U1 and U2. They have the phase displacement $\theta$, as can be seen from FIG. 2. Both voltages are fed to the amplifier tubes 1 and 2 between the terminals 3, 4 and 5 by means of the coupling condensers 6 and 7. The tubes are so connected that a control voltage U1' appears at the output 10 on the anode side at the working resistance 8 over the condenser 9. It is displaced by 180 degrees compared to the voltage U1. From the cathode side a second control voltage U1'' is tapped at the resistance 11 over the condenser 12 at the point 13, this voltage U1'' being oppositely directed to the voltage U1', that is, in phase with U1. The resistances 8 and 11 must be equal so that the amplitude of both voltages is equal. The same is done by means of the tube 2 with the voltage U2. The two oppositely directed voltages U2' and U2'' are then formed. The two voltages thus obtained are fed to the diode pairs 14, 17 and 15, 16 which are connected by means of the resistances 18 to 21 with a source of negative potential. In the diode pair 14, 17, the voltages U1' and U2' are combined, and in the diode pair 15, 16 the voltages U1" and U2" are combined. The diode circuit is so selected that a positive voltage appears at the points 24 and 25 only when the half waves of both associated voltages are positive at the same time, that is, at the point 24 when U1' and U2' have positive directions, and at the point 25 when U1" and U2" are at the same time positive. This way both half-waves can be taken into account. The method of operation of this diode circuit is as follows: When the diodes block, there is a positive voltage at the points 24 and 25, but when the diodes allow the current to pass through, this voltage practically collapses since the resistances 18 to 21 are substantially smaller than the resistances 22 and 23, and there is a negative voltage at these points. The diodes block when the voltage on the input side is greater than on the output side, which is the case when the supplied voltages have a sufficiently high positive value. Since the diodes are combined in pairs, it suffices if one diode lets the current pass so that the voltage collapses at the output. If U1' and U2' have at the same time a high positive value, there is a positive voltage U− at the point 24; if the half waves of U1" and U2" are at the same time positive, the voltage U+ exists at the point 25, if the original measuring quantities U1 and U2 are positive. The voltage U− appears when the two original measuring quantities U1 and U2 are negative. This is represented in FIG. 2. The two voltages U+ and U− are applied to the grids of the double cathode amplifier tube 26. The tube carries anode current when one grid is positive. Thus both voltages are mixed and the voltage U3 is formed at the resistance 27, which contains both half waves as positive impulses.

The width of the rectangular impulses thus formed is a measure for the phase displacements between the voltages U1 and U2, because when θ is equal to zero degrees the half waves overlap completely. Voltage U3 would then be a continuous direct voltage. The greater the phase displacement, the greater is the voltage-free interval of the impulses of U3. When θ equals 90 degrees the width of the interval and of the impulses are equal. When θ equals 180 degrees the voltage is zero. An arrangement must also exist from which the size of the phase displacement can be seen. In long distance relays it is particularly important to know when a certain phase angle θ° is reached.

If θ is greater than θ°, there must be no release; if θ is less than θ°, the impulse must be released. The device acts so that with θ less than θ°, an impulse appears at the output; with θ greater than θ° it does not appear. This is achieved by an integrator circuit 28, 29 and an amplitude comparator. Condenser 29 of the integrator circuit is charged after a time constant which is determined by the size of the resistance 28 and of the condenser 29. The voltage Uc on the condenser rises then up to a certain value, which varies according to the duration of the charging time, that is, the length of the impulse. Since this length depends on the phase displacement between the two voltages being compared, the end amplitude of the voltage Uc is thus a measure for the phase displacement.

The voltage Uc is compared in the amplitude comparator with a constant voltage Uco. If Uc is greater than Uco, an impulse voltage Ua is formed at the output. If Uc is less than Uco, however, it is not. The amplitude comparator consists, for example, of a double cathode amplifier tube 30 with two grids. On one grid is applied the voltage Uc which has a negative bias compared to the cathode. The ignition of this tube portion is so timed that it ignites when Uc equals Uco. A voltage Uco is applied at the other grid which is tapped from the plate resistance 31. The grid has thus a positive bias as long as no current flows through the resistance 31, so that this tube portion transmits currents. The voltage at the point 34 is thus low. If Uc is greater than Uco, anode current flows through the resistance 31 and the grid bias for the grid 33 collapses. The negative bias is now effective and no current flows in the resistance 35. The voltage Ua rises thus and a release impulse is formed by means of which a release magnet or a relay can be actuated.

Care has to be taken in this arrangement that the condenser 29 is discharged as rapidly as possible so that the impulses can appear in rapid succession and any increase of the voltage on the condenser, due to remaining residual charges is avoided. This is achieved by means of the diode 36, which lets the current pass when U3 is zero.

The amplifier arrangement with the tubes 1 and 2 must be designed in known manner as a broad band amplifier so that both the steep flanks and the flat portion of the approximately rectangular curve are transmitted in full scale.

Instead of the tube circuit for realizing the idea of the invention, shown and described here, one can also use a transistor circuit, as shown in FIG. 3. The tubes can also be replaced individually by transistors. FIG. 3 shows an arrangement where all tubes have been replaced by transistors. The effect is as follows:

The transistors 37 and 38 replace the tubes 1 and 2. They amplify the supplied rectangular voltage. The in-phase voltage arrives at the transistors 41 and 42 corresponding to the diode pair 15 and 16, and the oppositely directed voltage at the transistors 39 and 40 corresponding to the diode pair 14 and 17. When the voltage at the base of the transistors is positive, the latter block, and a negative voltage appears at their output. A positive voltage at the common output of these transistors 39 to 42 is only formed when both associated transistors are negative at the base. Positive impulses will thus appear when both applied voltages are negative. The voltages U+ and U− thus obtained are mixed by the transistors 45 and 46, just as in the double grid tube 26. At their output appear negative impulses as voltage U3. The latter is fed again to an integrator circuit 47, 48, whose resistance can be discharged over through a diode 49 formed of semiconductors. The sawtooth impulses thus obtained are again fed to an amplitude comparator provided with the transistors 50 and 51. The transistor 50 is released by the negative impulse Uc, when it drops below the voltage Uco, so that the voltage at the point 52 becomes more positive and an impulse is formed at the output.

It is sometimes desirable to have additional measuring quantities act on the phase discriminator. These can be voltages which are to prevent a release of the relay. It can happen that the relay is to be blocked by means of the main voltage at certain phase angles which occur in disturbances as well as in normal operation. To this end the negative grid potentials, or the diodes at the resistances 18 to 21, assumed as constant in the drawings, can be influenced by the voltage itself in such a way that the entire arrangement is blocked at higher voltage values.

The advantage of the arrangement according to the invention, apart from the above mentioned possibility of utilizing positive and negative half waves and reducing the response time, is the reaction-free combination of the impulses by means of the double grid tube, so that only a single integrator and a single amplitude comparator are required. The additional discharge diode permits an accurate measurement even in rapid succession. The constancy of the amplitudes can be obtained by the D.-C. sources. It is determined by a suitable selection of the grid potential. The leakage is very low, since only a single integrator is used.

I claim:

1. Apparatus for determining the displacement in phase between two out-of-phase alternating current input voltages of the same amplitude and having an essentially rectangular wave form comprising means deriving from each of said input voltages a control voltage of the same amplitude but 180° out-of-phase with respect to its corresponding input voltage, means combining like half cycles of said input voltages to obtain a first voltage representative of the overlap therebetween, means combining the same like half cycles of said control voltages to obtain a second voltage representative of the overlap therebetween and which is displaced 180° out-of-phase with said first voltage, means mixing said first and second voltages so that said voltages appear in succession a half-cycle apart at the output of said mixer, and means integrating the output of said mixer thereby to produce impulse voltages spaced a half-cycle apart and having amplitudes respectively proportional to the duration of said first and second voltages.

2. Apparatus as defined in claim 1 for determining phase displacement wherein said integrating means is comprised of a resistance-condenser circuit, the condenser of which is charged by the output of said mixer to a voltage having a sawtooth form, and which further includes a diode connected in circuit with said condenser for discharging the same when said mixer output becomes zero.

3. Apparatus for determining the displacement in phase between two out-of-phase alternating current input voltages of the same amplitude and having an essentially rectangular wave form comprising means deriving a pair of similarly configured alternating control voltages for each such input voltage, one control voltage of each such pair being in phase with its corresponding input voltage and of the same amplitude and the other control voltage of said pair being 180° out-of-phase with its corresponding input voltage and of the same amplitude, means combining like half cycles of the in-phase control voltages to obtain a first voltage representative of the overlap therebetween, means combining the same like half cycles of the 180° out-of-phase control voltages to obtain a second voltage representative of the overlap therebetween, said second voltage thereby being displaced 180° out-of-phase with said first voltage, means mixing said first and second voltages so that said voltages appear in succession a half-cycle apart at the output of said mixer, and means integrating the output of said mixer thereby to produce impulse voltages spaced a half cycle apart and having amplitudes respectively proportional to the duration of said first and second voltages.

4. Apparatus as defined in claim 3 for determining phase displacement wherein said means for deriving each said pair of control voltages from its corresponding input voltage includes a broad band amplifier fed by said input voltage thereby to assure faithful transmission of the rectangular wave form of the latter.

5. Apparatus for determining the displacement in phase between two out-of-phase alternating current input voltages of the same amplitude and having an essentially rectangular wave form comprising an electronic amplifier tube for each of said input voltages and including control grids to which said input voltages are applied, each said tube developing in its cathode-anode circuit a pair of similarly configured alternating control voltages, one such control voltage of each such pair being in phase with its corresponding grid input voltage and of the same amplitude, and the other control voltage of said pair being 180° out-of-phase with its corresponding grid input voltage and of the same amplitude, a diode circuit for said in-phase control voltages, a similar diode circuit for said 180° out-of-phase control voltages, said control voltages being connected in their respective diode circuits such that said circuits become blocked for like half-cycles of said control voltages to develop corresponding diode circuit voltages which are a half-cycle apart and which are representative respectively of the overlap between said in-phase control voltages and between said 180° out-of-phase control voltages, means mixing said diode circuit voltages so that said voltages appear in succession a half-cycle apart at the output of said mixer, and means integrating the output of said mixer thereby to produce impulse voltages spaced a half-cycle apart and having amplitudes respectively proportional to the duration of said diode circuit voltages.

6. Apparatus for determining the displacement in phase between two out-of-phase alternating current input voltage of the same amplitude and having an essentially rectangular wave form comprising a transistor for amplifying each of said input voltages, each said voltage being connected into the base of its corresponding transistor, each said transistor producing in its collector-emitter circuit a pair of similarly configured alternating control voltages, one such voltage of each pair being in-phase with its corresponding base input voltage and of the same amplitude, and the other control voltage of said pair being 180° out-of-phase with its corresponding base input voltage and of the same amplitude, a transistor circuit for said in-phase control voltages, a similar transistor circuit for said 180° out-of-phase control voltages, said control voltages being connected in their respective transistor circuits such that said circuits become blocked for like half-cycles of said control voltages to develop corresponding transistor circuit voltages which are a half-cycle apart and which are representative respectively of the overlap between said in-phase control voltages and between said 180° out-of-phase control voltages, a transistor mixer circuit for mixing said transistor circuit voltages so that said voltages appear in succession a half-cycle apart at the output of said mixer, and means integrating the output of said mixer thereby to produce impulse voltages spaced a half-cycle apart and having amplitudes respectively proportional to the duration of said transistor circuit voltages.

7. Apparatus as defined in claim 1 for determining phase displacement wherein said means for mixing said first and second voltages is constituted by a double cathode amplifier.

References Cited in the file of this patent

UNITED STATES PATENTS

| 2,747,030 | Nuckolls | May 22, 1956 |
| 2,890,329 | Lebenbaum | June 9, 1959 |
| 2,900,534 | Chater | Aug. 18, 1959 |

FOREIGN PATENTS

| 741,482 | Great Britain | Dec. 7, 1955 |